US009628906B2

(12) United States Patent
Chowdary et al.

(10) Patent No.: US 9,628,906 B2
(45) Date of Patent: Apr. 18, 2017

(54) METHOD AND ELECTRICAL INTERFACE CIRCUIT ENABLING MULTIPLEXING

(75) Inventors: Gajendranath Chowdary, Warangal (IN); Ravpreet Singh, Bangalore (IN); Shyam Somayajula, Bangalore (IN)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 920 days.

(21) Appl. No.: 13/995,365

(22) PCT Filed: Feb. 9, 2012

(86) PCT No.: PCT/EP2012/052210
§ 371 (c)(1),
(2), (4) Date: Feb. 5, 2014

(87) PCT Pub. No.: WO2012/107519
PCT Pub. Date: Aug. 16, 2012

(65) Prior Publication Data
US 2014/0139046 A1 May 22, 2014

Related U.S. Application Data

(60) Provisional application No. 61/473,476, filed on Apr. 8, 2011.

(30) Foreign Application Priority Data

Feb. 10, 2011 (IN) .............................. 346/DEL/2011
Jul. 8, 2011 (EP) ..................................... 11173169

(51) Int. Cl.
*H01H 47/00* (2006.01)
*H01H 83/00* (2006.01)
(Continued)

(52) U.S. Cl.
CPC .............. *H04R 3/00* (2013.01); *H02J 7/0042* (2013.01); *H02J 7/0055* (2013.01); *Y10T 307/858* (2015.04)

(58) Field of Classification Search
CPC .. H04R 2420/05; H04R 2420/09; H04R 3/00; H04R 5/04
(Continued)

(56) References Cited

U.S. PATENT DOCUMENTS 5,872,445 A * 2/1999 Ozawa .................. H02J 7/0068
320/107
6,408,194 B1 6/2002 Merker
(Continued)

FOREIGN PATENT DOCUMENTS

DE 19921447 A1 11/2000
EP 1 134 958 A1 9/2001
(Continued)

OTHER PUBLICATIONS

International Preliminary Report on Patentability/Written Opinion of the International Searching Authority issued in corresponding International Application No. PCT/EP2012/052210, date of issuance Aug. 13, 2013.
(Continued)

*Primary Examiner* — Carlos Amaya
*Assistant Examiner* — Esayas Yeshaw
(74) *Attorney, Agent, or Firm* — The Danamraj Law Group, P.C.; Thomas L. Crisman; Kenneth A. McClure

(57) ABSTRACT

An electrical interface circuit includes a microphone circuit, a battery charger circuit and an electrical connector for connecting the electrical interface circuit to an external device. The electrical connector has a pin on which signals are multiplexed for connecting either the battery charger circuit to an external supply voltage, or the microphone
(Continued)

circuit to an external microphone. The battery charger circuit includes an amplifying circuit for controlling voltage or current to a battery at battery charging, and a p-type power transistor. The pin is connected to the microphone circuit and to a source of the p-type power transistor. When a voltage applied to the pin exceeds the battery voltage, the p-type power transistor provides current from the pin to the charger circuit, and, otherwise, the charger circuit and battery are disconnected from the pin. A method of multiplexing signals on the electrical interface circuit is also disclosed.

20 Claims, 6 Drawing Sheets

(51) Int. Cl.
  *H02J 7/00* (2006.01)
  *H04R 3/00* (2006.01)
(58) Field of Classification Search
  USPC .......................................................... 307/130
  See application file for complete search history.

(56) References Cited

U.S. PATENT DOCUMENTS

| | | |
|---|---|---|
| 6,731,762 B1 | 5/2004 | Chiang |
| 7,095,213 B2 | 8/2006 | Weng |
| 7,493,148 B2 | 2/2009 | Ha et al. |
| 7,735,996 B2 | 6/2010 | Van Der Zwan et al. |
| 8,907,635 B2 * | 12/2014 | Wu ........................ H02J 7/0077 320/164 |
| 2005/0077870 A1 | 4/2005 | Ha et al. |
| 2006/0255853 A1 * | 11/2006 | Masuko ................ H02M 3/073 327/536 |
| 2007/0181952 A1 * | 8/2007 | Uehara ..................... G05F 3/30 257/378 |
| 2009/0058369 A1 * | 3/2009 | Wang .................... H02J 7/0077 320/149 |
| 2009/0108677 A1 * | 4/2009 | Walter ................ H02M 3/1582 307/80 |
| 2010/0201305 A1 * | 8/2010 | Petroianu .................. H02J 7/35 320/102 |
| 2011/0012651 A1 * | 1/2011 | Kaidoh .................. H03K 17/20 327/143 |
| 2011/0085685 A1 * | 4/2011 | Wai ...................... H04R 1/1091 381/309 |
| 2011/0193531 A1 * | 8/2011 | Sheng .................. H02J 7/0083 320/148 |
| 2012/0153908 A1 * | 6/2012 | Wu ........................ H02J 7/0031 323/271 |

FOREIGN PATENT DOCUMENTS

| | | |
|---|---|---|
| EP | 1 315 361 A1 | 5/2003 |
| EP | 2 226 939 A2 | 9/2010 |

OTHER PUBLICATIONS

International Search Report issued in corresponding International application No. PCT/EP2012/052210, date of mailing Apr. 5, 2012.

* cited by examiner

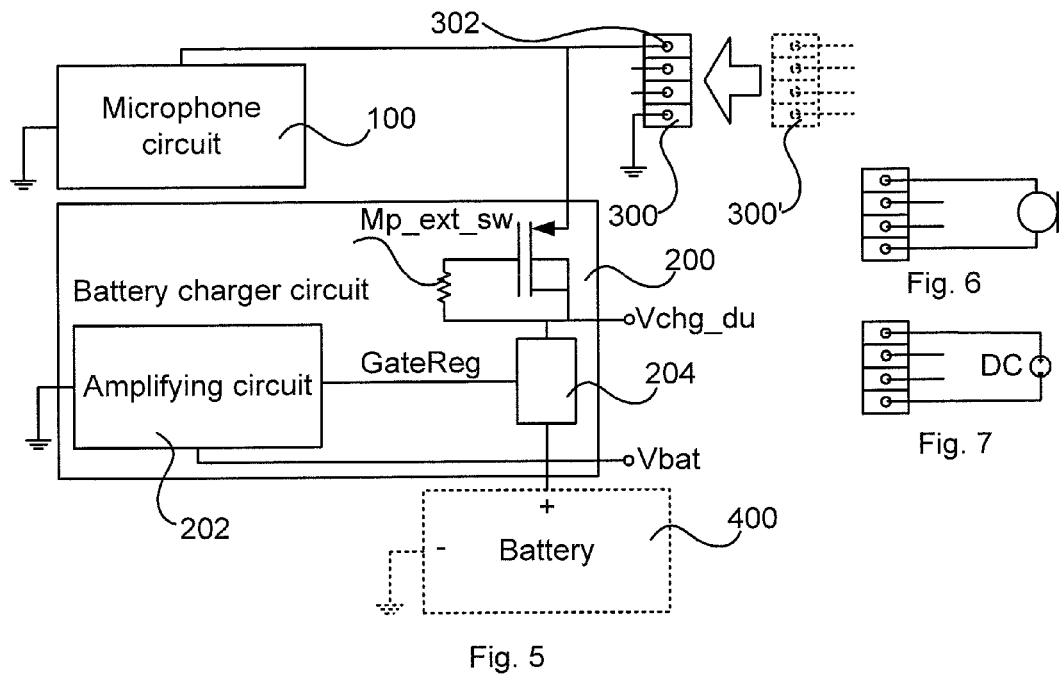
Fig. 5
Fig. 6
Fig. 7
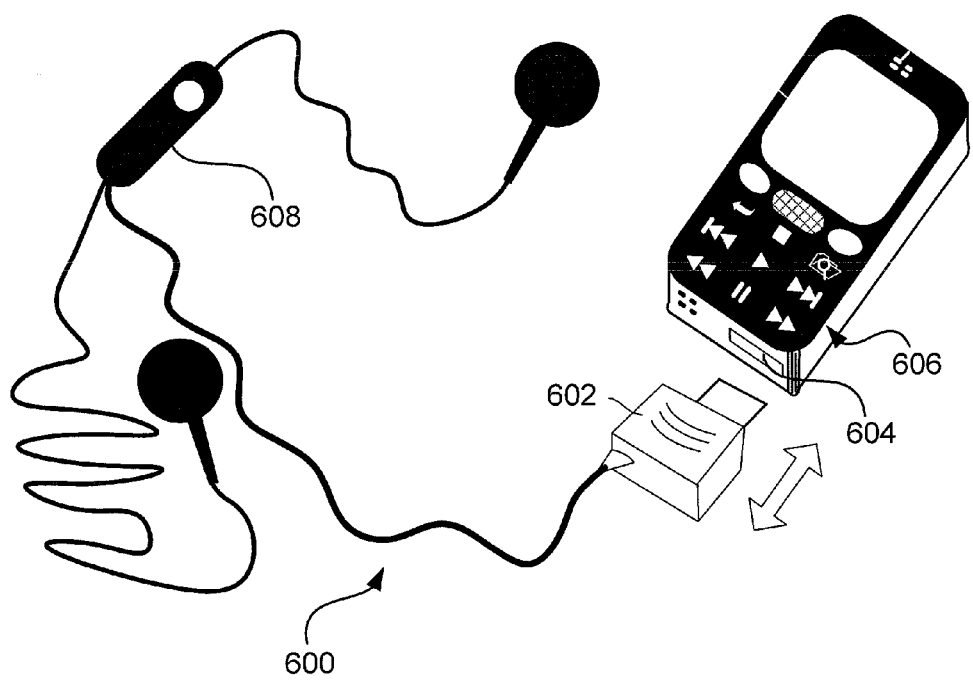
Fig. 6

METHOD AND ELECTRICAL INTERFACE CIRCUIT ENABLING MULTIPLEXING

TECHNICAL FIELD

The invention generally relates to a method and electrical interface circuit enabling multiplexing signals of external microphone and battery charger. The method and electrical interface is particularly suitable for use in a wireless communication handset.

BACKGROUND

In, for example, conventional wireless communication handset battery charging, an input is shared with Microphone (Mic) on Vbus pin of Micro Universal Serial Bus (μUSB) connector to save the number of pins and the board area. The Mic and microphone are generic terms used to describe transducers that convert acoustic energy into electrical energy, or more precisely sound waves into electrical signals. Microphones providing high-quality reproduction of sound are desirable in wireless communication applications such as cell phones.

Battery charging circuitry intelligently controls the charging function to deliver optimal battery charging while also protecting the system from an excessively high voltage supply input. The battery charging input can be either a supply from an AC/DC or DC/DC adapter or a Vbus from micro USB connector.

A conventional battery charger circuit example is shown in FIG. 1. As illustrated the battery charger circuit requires a capacitor of the magnitude 1 μF on the Vbus pin. The capacitor is suitable for two reasons: the first reason may be to take Electro Static Discharge (ESD) between the Vbus pin and a ground pin; the second reason is to work as a supply filter on the Vbus pin.

The microphone produces electrical signals for example in a frequency ranging from 100 Hz to 8 KHz. To multiplex the microphone with the Vbus, it is desired to isolate or open the capacitor when the microphone is connected. Typically external off chip solutions are used to isolate the 1 μF capacitor when the microphone is connected. One such example is illustrated in FIG. 2. As illustrated, a power switch SO is used in series to isolate the capacitor when microphone is connected on the Vbus. Although this solution is simple, it requires an extra power transistor and extra control, including signalling and logic, to open or connect the charging path and the capacitor. It also results in an increased board area. To omit disconnecting the capacitor may alter the impedance when operating in microphone state which may decrease the signal/sound quality and/or level.

Another implementation is illustrated in FIG. 3. As illustrated a switch SO is provided in series with the capacitor. The switch may not necessary be a power transistor, however it should have low Effective Series Resistance (ESR). Again this design is simple, however it requires an extra transistor with low ESR and extra control, including its signalling and logics, to open or connect the capacitor that results at least in an increased board area.

It is therefore a desire to provide a circuitry which enables a shared connection pin for different purposes with less complexity in sense of any of signalling, logics, and components for adapting to the different purposes.

SUMMARY

An object of the invention is to at least alleviate the above stated problem. The present invention is based on the understanding that provision of an external device for charging the battery provides a voltage at least slightly higher than the battery voltage, while an external device comprising a microphone, e.g. a headset, does not provide any such voltage. The inventors have found that this difference can be used for automatically connecting/disconnecting battery charger circuitry and battery from the common pin, and have further found a solution which does not require many additional components, and particularly, does not require additional signalling or logics.

According to a first aspect, there is provided an electrical interface circuit comprising a microphone circuit; a battery charger circuit; and an electrical connector for connecting said electrical interface circuit to an external device. The electrical connector has a pin on which signals are multiplexed for connecting either the battery charger circuit to an external supply voltage or the microphone circuit to an external microphone. The battery charger circuit comprises an amplifying circuit for controlling voltage or current to a battery at battery charging, and a p-type power transistor. The pin is connected to the microphone circuit and to a source of the p-type power transistor. When a voltage applied to the pin exceeds the battery voltage, the p-type power transistor will provide current from the pin to the charger circuit, and otherwise the charger circuit and battery is disconnected from the pin.

The battery charger circuit may further comprise a capacitor suitable for voltage supply filtering connected to a drain of the p-type power transistor, wherein the capacitor only impacts impedance at the pin when the voltage applied to the pin exceeds the battery voltage. The electrical interface circuit may further comprise an electrostatic discharge protection circuit comprising the capacitor and an inherent body diode of the p-type power transistor.

The battery charger circuit may comprise a resistor connected between a gate and a drain of the p-type power transistor such that, when the voltage applied to the pin exceeds the battery voltage, the p-type power transistor will provide current to the charger circuit, and otherwise the charger circuit and battery is disconnected from the pin.

The battery charger circuit may further comprise a charging regulating power transistor having its source powered from the p-type power transistor source and its gate controlled by the amplifying circuit such that power provided at its source is connected to the battery for charging. The amplifying circuit may provide its control to the gate of the charging regulating power transistor based on a measured battery voltage. The battery charger circuit may further comprise a resistor connected to the battery and such that current provided to charge the battery is drawn through the resistor, wherein a voltage over the resistor gives a measure of charging current, and the amplifying circuit provides its control to the gate of the charging regulating power transistor based on a measured the voltage over the resistor. The battery charger circuit may further comprise a stabilising capacitor connected between the source and gate of the charging regulating power transistor such that the voltage at the gate of the charging regulating power transistor is made a dominant pole for regulating power provided for battery charging.

The electrical connector may be a Universal Serial Bus, USB, connector, and the pin on which signals are multiplexed for connecting either the battery charger circuit to an external supply voltage or the microphone circuit to an external microphone may be the Vbus pin according to USB specifications.

The microphone circuit may be arranged to provide a bias voltage to the pin for the external microphone, when connected. The electrical connector may further comprise an identification pin on which the interface circuit is enabled to identify type of external device connected, wherein the bias voltage is provided upon identification of connection of the external microphone.

The electrical connector may be a mini or micro USB connector, and the identification pin may be the ID pin according to USB specifications.

According to a second aspect, there is provided a method of multiplexing signals of a pin of an electrical interface circuit for connecting either the battery charger circuit to an external supply voltage or the microphone circuit to an external microphone. The electrical interface circuit comprising a microphone circuit; a battery charger circuit; and the electrical connector for connecting said electrical interface circuit to an external device, the electrical connector having a pin on which signals are multiplexed for connecting either the battery charger circuit to an external supply voltage or the microphone circuit to an external microphone, wherein the battery charger circuit comprising an amplifying circuit for controlling voltage or current to a battery at battery charging; and a p-type power transistor, wherein the pin is connected to the microphone circuit and to a source of the p-type power transistor. The method comprises providing current from the pin to the charger circuit by the p-type power transistor when a voltage applied to the pin exceeds the battery voltage; and disconnecting the charger circuit and battery from the pin otherwise. The operation of providing current or disconnecting the charger circuit is performed solely based on the voltage levels of the battery and the voltage on the pin provided at source and drain, respectively, of the p-type power transistor.

The battery charger circuit may comprise a resistor connected between a gate and a drain of the p-type power transistor, and a transition from a disconnected state to a state of providing current of the p-type power transistor may comprise starting providing current from the source to the drain of the p-type power transistor when the voltage applied to the pin exceeds the battery voltage and a voltage is inherently provided over the resistor.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

FIG. 5 is a diagram illustrating an electrical interface circuit according to an embodiment.

FIGS. 6 and 7 schematically illustrate examples of external devices connectable to the electrical connector.

DETAILED DESCRIPTION OF PREFERRED EMBODIMENTS

Figure 4:
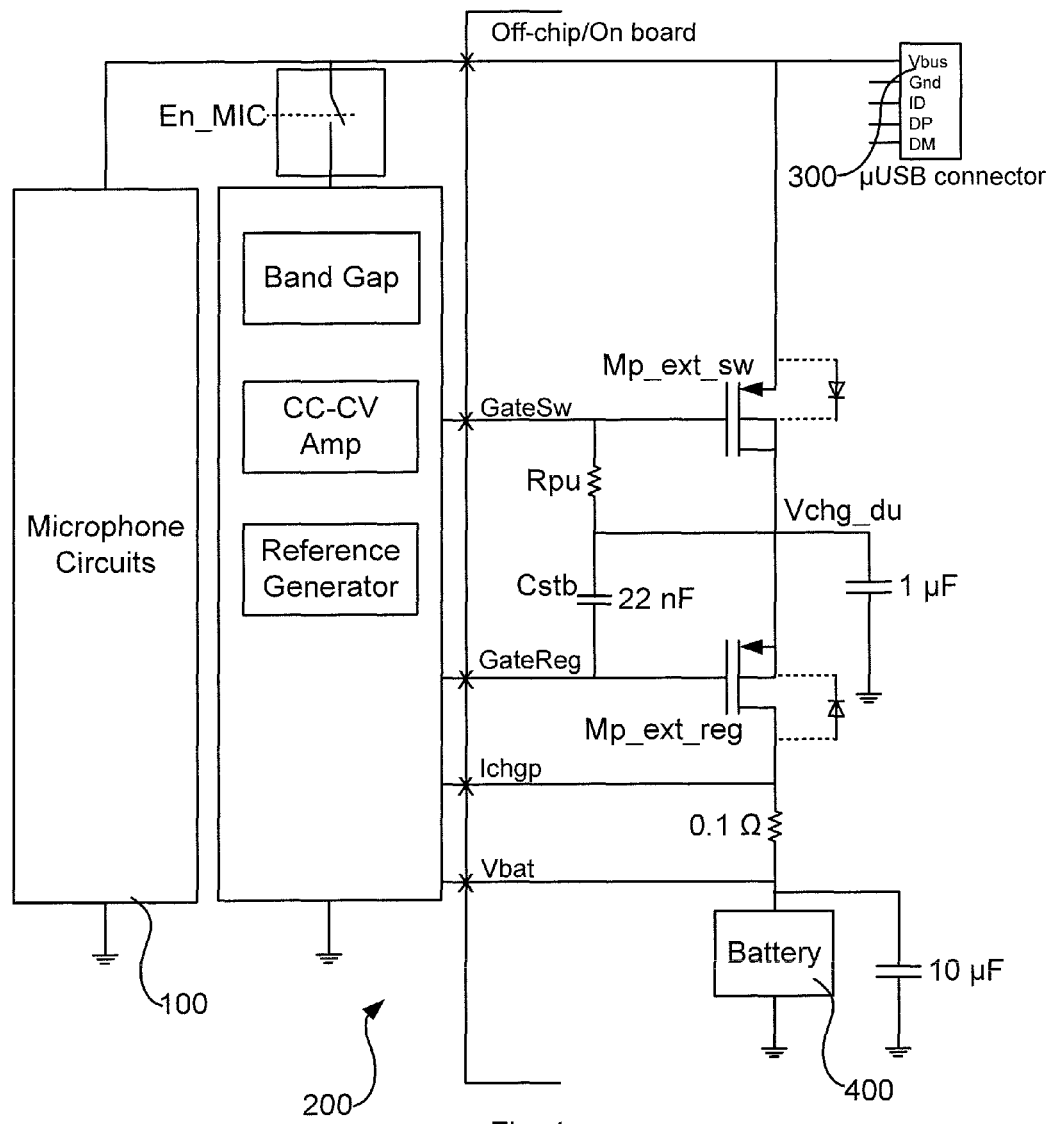
FIG. 4 illustrates a sketch depicting both a logical effect of an electrical interface circuit and an example of a circuitry for implementing the same according to an embodiment.

FIG. 4 illustrates a sketch depicting both a logical effect of an electrical interface circuit and an example of a circuitry for implementing the same. FIG. 4 illustrates main components included in or involved with the electrical interface circuit. Included in the electrical interface circuit are a microphone circuit 100, a battery charger circuit 200, and an electrical connector 300. Involved with the electrical interface circuit is also a battery 400 and an external device (not shown) to be connected to the electrical connector 300. The electrical interface circuit is suitable for incorporation in for example a portable processing and/or communication device such as a cell phone, wherein for example the microphone circuit 100 is further connected to audio processing circuitry of the portable device, the electrical connector 300 is connected to digital or analog input/output means of the portable device, etc.

The microphone circuit 100 may be provided to amplify microphone output, i.e. the output of an external microphone connected to the electrical connector 300. The microphone circuit 100 may also be arranged to provide a bias voltage to the external microphone when connected to the electrical connector 300. The output of a bias voltage and the input of a microphone signal may be a joint action and performed using only one pin of the electrical connector 300. This can for example be made by taking a microphone signal at or over a bias resistor. Here, impedance matching and ability to achieve low-noise configurations is desired.

For enabling use of a common pin for multiple purposes, i.e. both for microphone operation as elucidated above and for receiving external power supply on the same pin, e.g. for battery charging, although not at the same time of course, the different requirements of the different states of operation need to be satisfied.

The battery charger circuit 200 comprises a voltage amplifying circuit. The voltage amplifying circuit may comprise a reference generator, a current-to-current or current-to-voltage (CC, CV) amplifier, and/or band-gap voltage regulator. The amplifying circuit have the purpose of providing appropriate power or power control for charging the battery, which may comprise different properties based on what type of battery is used, and comprise different strategies for different types of charging, such as speed-charging, maintenance charging, etc.

According to an embodiment a band-gap voltage regulator gives a pre-configured voltage, for example 1.2V, to generate the reference currents and voltages so as to charge the battery autonomously.

According to yet another embodiment, a CC-CV amplifier regulates the current through the battery or voltage on the battery node based on the battery voltage and the battery type.

The electrical connector can be a Universal Serial Bus, USB, connector, and the pin on which signals are multiplexed for connecting either the battery charger circuit to an external supply voltage or the microphone circuit to an external microphone is the Vbus pin according to USB specifications. The electrical connector 300 may comprise a mini or micro USB connector.

The microphone circuit 100 can be arranged to provide a bias voltage to the pin for the external microphone, when connected. The electrical connector 300 can further comprise an identification pin on which the interface circuit is enabled to identify type of external device connected, wherein the bias voltage is provided upon identification of connection of the external microphone. Where the electrical connector is a mini or micro USB connector, the identification pin is the ID pin according to USB specifications.

The circuit can comprise a chip internal switch used for powering internal blocks of charging logics. The switch being connected to the amplifying circuit at one end and to the microphone circuit and pin of the USB connector at its other end. This switch provides the advantage of avoiding the leakage from microphone bias voltage when microphone is connected on Vbus, while at the same time enabling a small switch, i.e. the current through it is very small since it only powers control logics and not the battery charging itself, which is enabled to be implemented on-chip together with small-signal logics. The use of a small-signal switch is enabled since battery charging current is not drawn through this switch. This switch is controlled by ID pin detection, having features as demonstrated above.

The circuit may further comprise a first resistor to measure the current fed into the battery.

The circuit can comprise at least two transistors. One of the transistors is configured to control the current flow from the charging device to the main battery through a GateReg voltage on its gate. The other transistor is configured to prevent reverse leakage of the current from the main battery when charge voltage is less than the battery voltage.

The circuit may further comprise a first capacitor for working as a supply filter on Vbus pin and to take Electro Static Discharge (ESD) between Vbus and a ground pin. According to yet another embodiment the transistor used to prevent reverse leakage of current from the main battery may also help in isolating the voltage supply filtering capacitor when the microphone is connected on Vbus. The circuit may further comprise a second capacitor to decap, i.e. a decoupling capacitor arranged handle transients, on battery node.

According to yet another embodiment the circuit may have a third capacitor to stabilize the CC-CV loop.

The circuit may further comprise a second resistor. The second resistor aids with turning on the transistor being configured to prevent reverse leakage of the current from the main battery when charge voltage is less than the battery voltage, when the charger voltage is more than the battery voltage, such that battery charging can commence.

Returning to FIG. 4, which illustrates the exemplary circuit for multiplexing battery charging input with the microphone. According to this depicted embodiment, the microphone is multiplexed with the battery charger by isolating the 1 µF capacitor, i.e. the voltage supply filtering capacitor, when the external microphone is connected on the pin, e.g. Vbus, with only one extra resistor and without any external extra control and/or transistor. As illustrated the microphone or supply, respectively, can be connected to for example a mobile handset to speak over phone or to charge the battery.

Detection of the microphone can be done from ID pin of the mini or micro USB connector and the charger is detected autonomously when connected. The charging device is a low impedance dc voltage source. A pair of external P-type Metal Oxide Semiconductor (PMOS) power transistors, i.e. the transistor Mp_ext_reg and the transistor Mp_ext_sw can be used. The transistor Mp_ext_reg controls the current flow from the charging device to the main battery through the voltage GateReg on its gate. The second transistor's MP_ext_sw internal body diode prevents reverse leakage current from the main battery when charge voltage is less than battery voltage. Whenever supply voltage is more than battery voltage, the transistor Mp_ext_sw is turned on by pulling the current through the resistor Rpu. A 22 nF capacitor Cstab is used to make the GateReg node a dominant pole for regulation loop and the second resistor, which may be of the magnitude 0.1 ohm, is used to measure the current going into the battery. When the charger is enabled, the second transistor Mp_ext_sw is turned on and the capacitor, which may be of the magnitude 1 µF, on node Vchg_du acts as a supply filter. For Electro Static Discharge (ESD) events, the capacitor is connected to the Vbus through a body diode of the second transistor Mp_ext_sw and to a ground pin. When voltage on the Vbus is less than the battery voltage the Vchg_du node is close to the battery voltage, an the transistor Mp_ext_sw is turned off which makes the pin, e.g. the Vbus, to not see the capacitor on the node Vchg_du.

Figure 1:
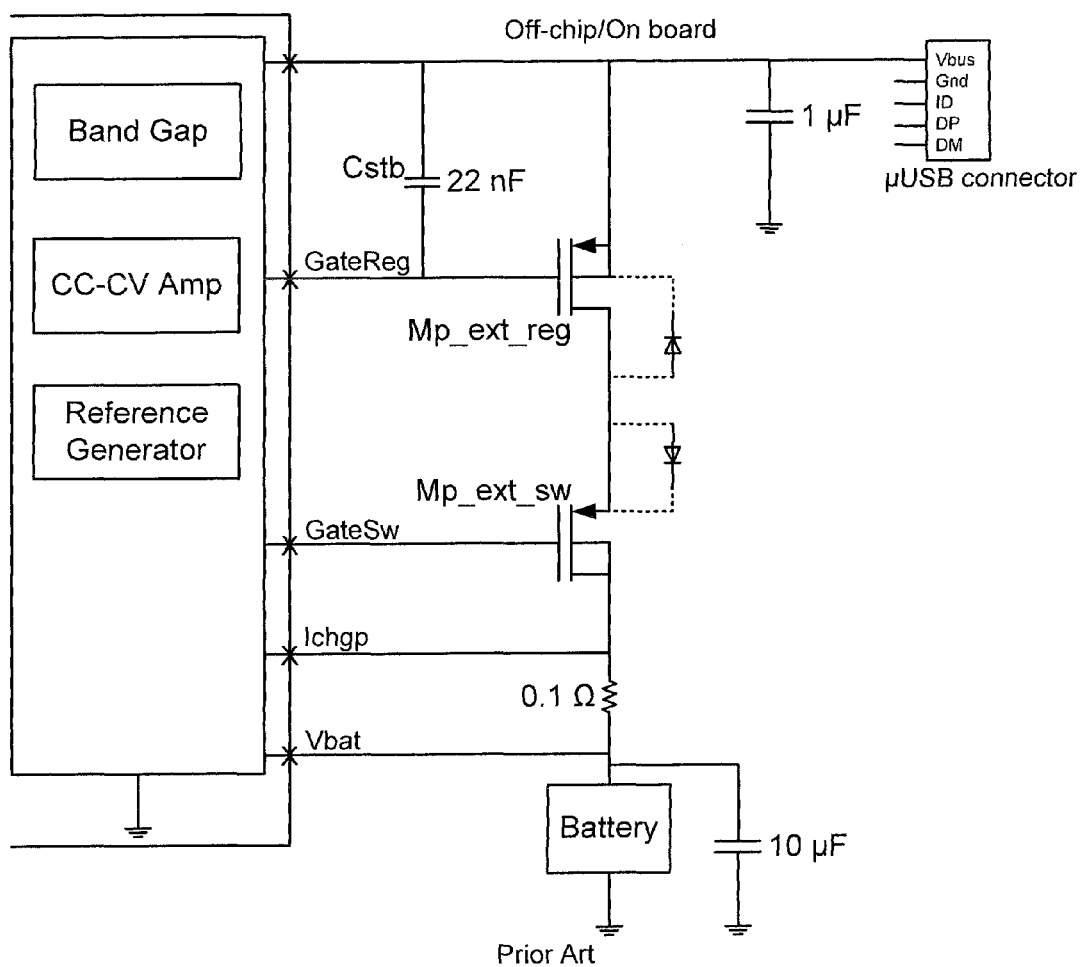
FIG. 1 illustrates a conventional battery charger circuit.
Figure 2:
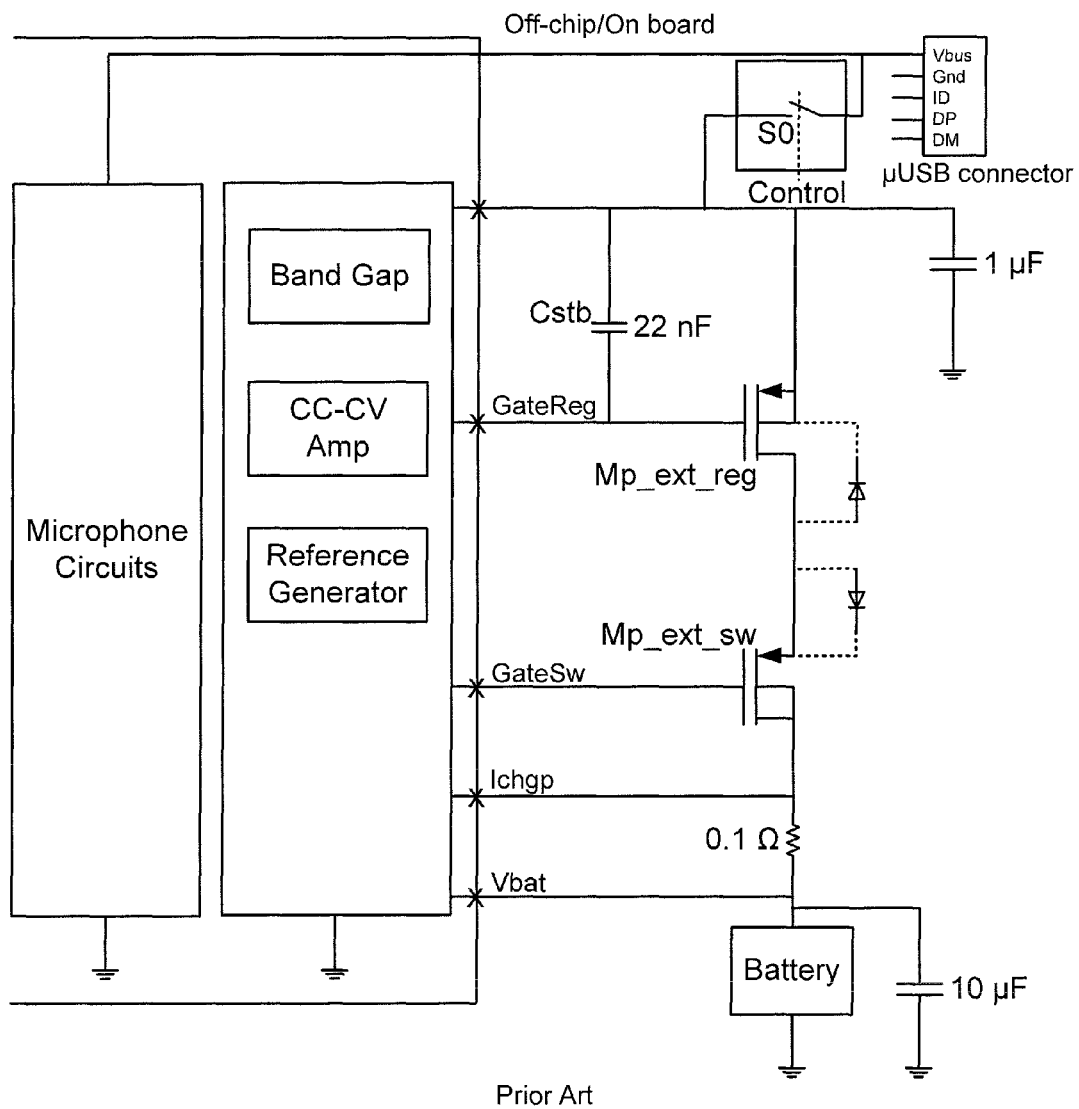
FIG. 2 illustrates an example using a switch for connecting/disconnecting a battery charger.
Figure 3:
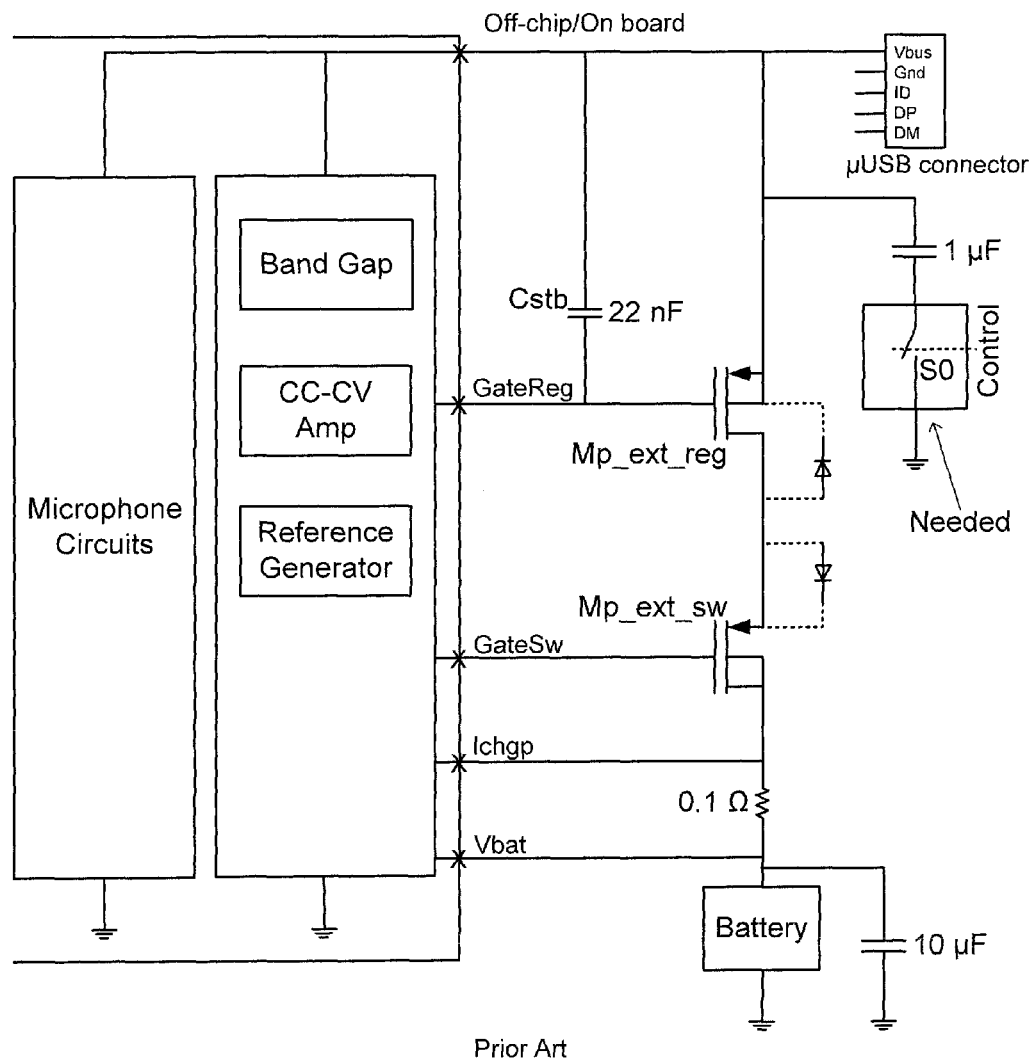
FIG. 3 illustrates an example where a switch is provided in series with a supply filtering capacitor for connecting/disconnecting.

Compared to the solution illustrated in FIG. 3, the solution illustrated in FIG. 4 can be seen as interchanging the order of the transistor Mp_ext_sw and the transistor Mp_ext_reg, with the difference that it is possible to isolate the supply filtering capacitor without using any additional switch and thereby required control signals and logics.

Regarding the microphone circuit 100, the bias voltage provided to a connected external microphone can be for example between 1.2V to 2.1V. When the external microphone is connected on the pin, e.g. to Vbus of the mini or micro USB supporting circuitry that detects the connected external device as a microphone with aid of a resistor in the ID pin. The microphone circuit 100 provides the bias voltage required for the external microphone and amplifies the input signal. When the external microphone is connected on the pin, it can be seen as the illustrative switch SWO, which in reality is provided by the particular structure of the power transistors in FIG. 4 and not needed as a component, is open and the leakage of the charger circuits from the pin is avoided.

When the external microphone is connected on the pin, voltage on the pin is less than the battery voltage and the transistor MP_ext_sw is turned off and the supply filtering capacitor is isolated from the microphone signal path.

This invention allows multiplexing battery charging input with microphone without adding any extra transistor and its control. Instead, the signal path of the external microphone is left without any substantial disturbing impedances when connected, which also improves signal quality and/or level. The advantage is therefore two-fold: less complex components and better signal path.

FIG. 5 is a diagram illustrating an electrical interface circuit comprising a microphone circuit 100, a battery charger circuit 200 and an electrical connector 300.

The electrical connector 300 is arranged to receive a mating connector 300' of an external device. The battery charger circuit 200 is arranged to charge a battery 400 that can be connected to the electrical interface circuit. The elements 300', 400 being connectable to the electrical interface circuit is illustrated by dashed lines. The microphone circuit 100 comprises means for biasing and amplifying to make an external microphone connected to the connector 300 work properly. The battery charger circuit 200 comprises an amplifying circuit 202 arranged to provide proper voltage control for charging the battery 400, and a current valve 204 controlled by a signal GateReg provided by the amplifying circuit 202. The amplifying circuit 202 provides the signal GateReg based on measured battery voltage Vbat. The current valve 204 is supplied with a voltage Vchg_du when a DC supply is connected to the connector 300. The battery charger circuit further comprises a power transistor Mp_ext_sw, which preferably is a MOSFET of p-type having its source connected to a pin 302 of the connector 300 to which also the microphone circuit 100 is connected. When a voltage is applied to the pin 302 exceeds the battery voltage Vbat, the p-type power transistor will provide a current from the pin 302 to the charger circuit 200, which via the current valve 204 will charge the battery 400. When the voltage at the pin 302 is less than the battery voltage Vbat, such as when an external microphone is connected to the connector, the p-type power transistor will be in an off-state and the battery charger 200 and the battery 400 are functionally disconnected from the pin 302. The gate of the p-type power transistor Mp_ext_sw is connected to the drain of the p-type power transistor Mp_ext_sw, for example via a resistor 206, to enable the p-type power transistor Mp_ext_sw to enter an on-state when there is a higher voltage at its source than at its drain.

Figure 7:
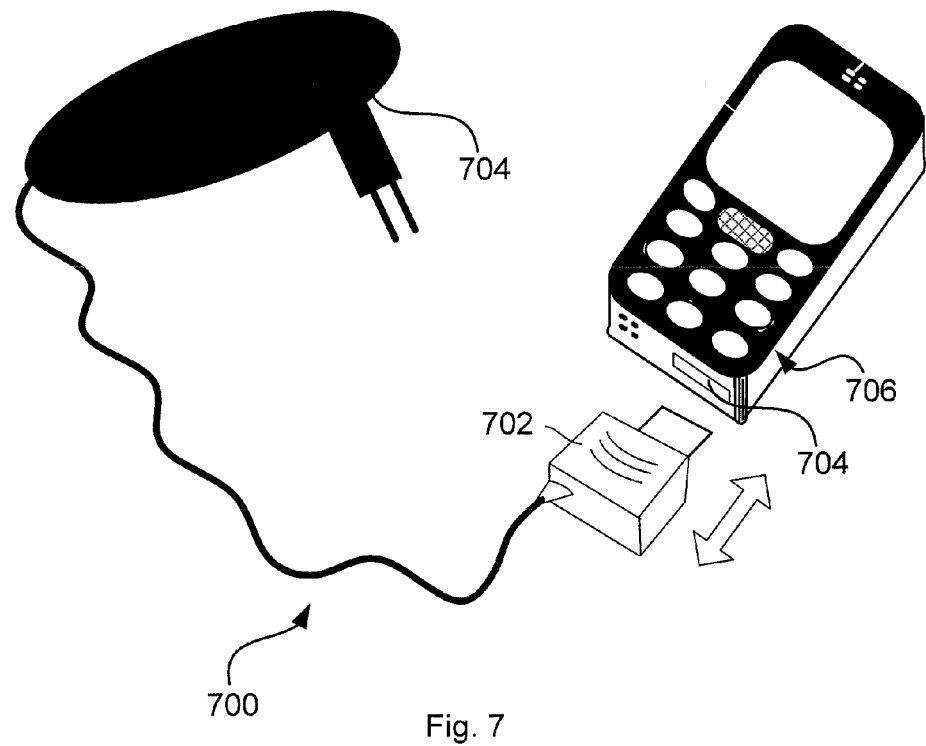

FIGS. 6 and 7 schematically illustrate examples of external devices connectable to the electrical connector 300, where FIG. 6 illustrates a microphone device and FIG. 7 illustrates a DC voltage supply. Other examples, comprising speaker, digital communication line, electro-mechanic input means, etc. are also feasible, as well as composite devices comprising two or more of the above functions.

FIG. 6 specifically illustrates a headset 600 connectable by a connector 602 to a mating connector 604 of a mobile device 606. The headset 600 comprises a microphone 608, which connects according to the principles demonstrated above.

FIG. 7 specifically illustrates a charger supply 700, arranged to be connected to mains by a AC/DC converter 704 and by a connector 702 to a mating connector 704 of a mobile device 706. The power supplied connects according to the principles demonstrated above. Although the illustrated charger supply 700 is illustrated as one to be connected to mains, similar principles apply for a charger supply to be connected to a DC source, wherein the AC/DC converter 704 is substituted with a DC/DC converter, e.g. if arranged to be connected to a DC output in a car, or the AC/DC converter is substituted with a USB connector, wherein no conversion is necessary if the applied interface to the mobile device 706 also follows the USB standard, as demonstrated for some embodiments above.

Figure 8:
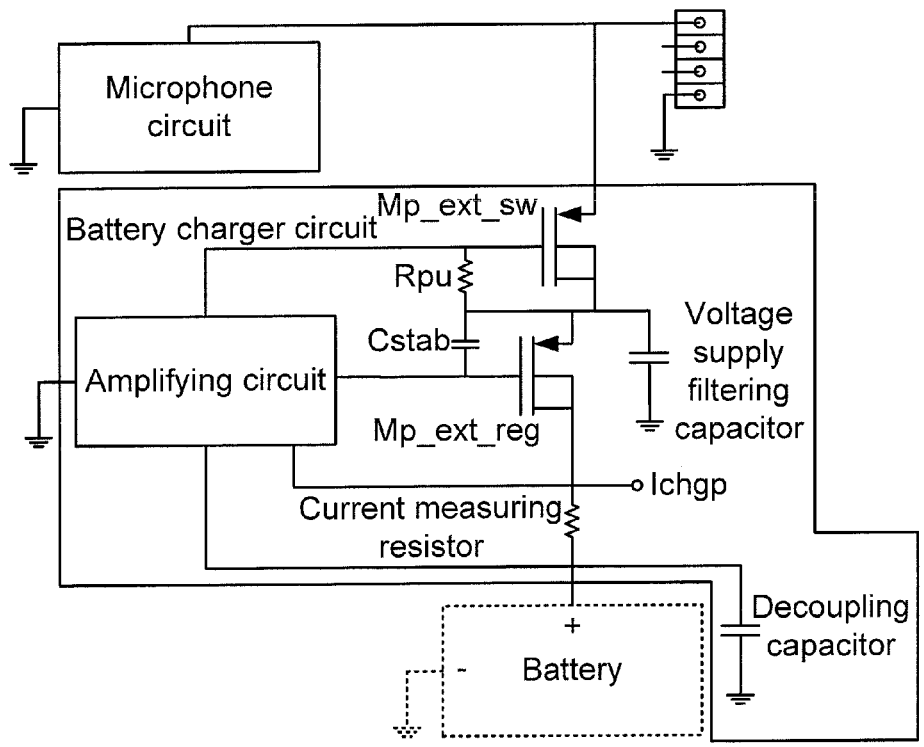
FIG. 8 is a diagram schematically illustrating the embodiment depicted in FIG. 4.

FIG. 8 is a diagram schematically illustrating the embodiment depicted in and elucidated with reference to FIG. 4, but illustrated with resemblance to FIG. 5 for easier understanding of possible variations.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An electrical interface circuit comprising:
a microphone circuit;
a battery charger circuit; and
an electrical connector for connecting said electrical interface circuit to an external device, the electrical connector having a pin on which signals are multiplexed for connecting either the battery charger circuit to an external supply voltage or the microphone circuit to an external microphone,
wherein
the battery charger circuit includes an amplifying circuit for controlling voltage or current to a battery during battery charging, and a p-type power transistor,
the pin is connected to the microphone circuit and to a source of the p-type power transistor,
when a voltage applied to the pin exceeds the battery voltage, the p-type power transistor provides current from the pin to the battery charger circuit, and, when the voltage applied to the pin does not exceed the battery voltage, the charger circuit and battery is disconnected from the pin, and
the battery charger circuit comprises a resistor connected between a gate and a drain of the p-type power transistor such that, when the voltage applied to the pin exceeds the battery voltage, the p-type power transistor provides current to the battery charger circuit, and, when the voltage applied to the pin does not exceed the battery voltage, the battery charger circuit is disconnected from the pin.

2. The electrical interface circuit, according to claim 1, wherein the battery charger circuit further comprises a capacitor suitable for voltage supply filtering, the capacitor being connected to a drain of the p-type power transistor, and
wherein the capacitor only impacts impedance at the pin when the voltage applied to the pin exceeds the battery voltage.

3. The electrical interface circuit according to claim 2, wherein the capacitor is part of an electrostatic discharge protection circuit that also includes an inherent body diode of the p-type power transistor.

4. The electrical interface circuit according to claim 1, wherein the battery charger circuit further comprises a charging regulating power transistor having its source powered from a source of the p-type power transistor and its gate controlled by the amplifying circuit such that the power provided at its source is connected to the battery for charging.

5. The electrical interface circuit according to claim 4, wherein the amplifying circuit controls a gate of the charging regulating power transistor based on a measured battery voltage.

6. The electrical interface circuit according to claim 4, wherein the battery charger circuit further comprises a resistor connected to the battery and such that current provided to charge the battery is drawn through the resistor, wherein a voltage over the resistor gives a measure of charging current, and the amplifying circuit controls gate of the charging regulating power transistor based on the voltage measured over the resistor.

7. The electrical interface circuit according to claim 4, wherein the battery charger circuit further comprises a stabilizing capacitor connected between a source and a gate of the charging regulating power transistor such that a voltage at the gate of the charging regulating power transistor is made a dominant pole for regulating power provided for battery charging.

8. The electrical interface circuit according to claim 1, wherein the electrical connector is a Universal Serial Bus, USB, connector, and the pin on which signals are multiplexed for connecting either the battery charger circuit to an external supply voltage or the microphone circuit to an external microphone is a Vbus pin according to USB specifications.

9. The electrical interface circuit according to claim 1, wherein the microphone circuit is arranged to provide a bias voltage to the pin for the external microphone, when connected.

10. The electrical interface circuit according to claim 9, wherein the electrical connector further comprises an identification pin usable by the interface circuit to identify a type of an external device connected, wherein the bias voltage is provided upon identifying a connection of the external microphone.

11. The electrical interface circuit according to claim 10, wherein the electrical connector is a mini or micro USB connector, and the identification pin is an ID pin according to USB specifications.

12. A method of multiplexing signals of a pin of an electrical interface circuit for connecting either a battery charger circuit to an external supply voltage or a microphone circuit to an external microphone, the pin being part of an electrical connector for connecting said electrical interface circuit to an external device, the battery charger circuit comprising an amplifying circuit for controlling voltage or current to a battery during battery charging, and a p-type power transistor, wherein the pin is connected to the microphone circuit and to a source of the p-type power transistor, the method comprising:
providing a current from the pin to the charger circuit by the p-type power transistor when a voltage applied to the pin exceeds the battery voltage; and
disconnecting the battery charger circuit from the pin otherwise,
wherein the providing of the current or the disconnecting of the battery charger circuit is performed solely based on voltage levels of the battery and the voltage on the pin provided at a source and a drain, respectively, of the p-type power transistor,
wherein the battery charger circuit comprises a resistor connected between a gate and a drain of the p-type power transistor, and a transition from a disconnected state to a state of providing current of the p-type power transistor comprises starting providing current from the source to the drain of the p-type power transistor when the voltage applied to the pin exceeds the battery voltage and a voltage is inherently provided over the resistor.

13. The method according to claim 12, wherein the battery charger circuit further comprises a capacitor suitable for voltage supply filtering, the capacitor being connected to a drain of the p-type power transistor, and
wherein the capacitor only impacts impedance at the pin when the voltage applied to the pin exceeds the battery voltage.

14. The method according to claim 13, wherein the capacitor is part of an electrostatic discharge protection circuit that also includes an inherent body diode of the p-type power transistor.

15. The method according to claim 12, wherein the battery charger circuit further comprises a charging regulating power transistor having its source powered from a source of the p-type power transistor and its gate controlled by the amplifying circuit such that the power provided at its source is connected to the battery for charging.

16. The method according to claim 15, wherein the amplifying circuit controls a gate of the charging regulating power transistor based on a measured battery voltage.

17. The method according to claim 15, wherein the battery charger circuit further comprises a resistor connected to the battery and such that current provided to charge the battery is drawn through the resistor, wherein a voltage over the resistor gives a measure of charging current, and the amplifying circuit controls gate of the charging regulating power transistor based on the voltage measured over the resistor.

18. The method according to claim 15, wherein the battery charger circuit further comprises a stabilizing capacitor connected between a source and a gate of the charging regulating power transistor such that a voltage at the gate of the charging regulating power transistor is made a dominant pole for regulating power provided for battery charging.

19. The method according to claim 12, wherein the electrical connector is a Universal Serial Bus, USB, connector, and the pin on which signals are multiplexed for connecting either the battery charger circuit to an external supply voltage or the microphone circuit to an external microphone is a Vbus pin according to USB specifications.

20. The method according to claim 12, wherein
the microphone circuit is arranged to provide a bias voltage to the pin for the external microphone, when connected,
the electrical connector further comprises an identification pin usable by the interface circuit to identify a type of an external device connected, wherein the bias voltage is provided upon identifying a connection of the external microphone, and
the electrical connector is a mini or micro USB connector, and the identification pin is an ID pin according to USB specifications.

* * * * *

UNITED STATES PATENT AND TRADEMARK OFFICE
CERTIFICATE OF CORRECTION

PATENT NO. : 9,628,906 B2  
APPLICATION NO. : 13/995365  
DATED : April 18, 2017  
INVENTOR(S) : Chowdary et al.

Page 1 of 1

It is certified that error appears in the above-identified patent and that said Letters Patent is hereby corrected as shown below:

On the Title Page

Below item (54), in Column 1, insert -- (71) ST-ERICSSON SA, Plan-les-Ouates, (CH) --.

Below Title, delete item "(75)" and insert item -- (72) --, therefor.

Signed and Sealed this  
Seventeenth Day of December, 2019

Andrei Iancu  
*Director of the United States Patent and Trademark Office*